(12) United States Patent
Wang et al.

(10) Patent No.: US 10,942,560 B2
(45) Date of Patent: Mar. 9, 2021

(54) METHOD OF CONTROLLING HARD DISK AND ELECTRONIC DEVICE

(71) Applicant: EMC IP Holding Company LLC, Hopkinton, MA (US)

(72) Inventors: Chen Wang, Shanghai (CN); Ao Sun, Shanghai (CN); Gary Jialei Wu, Shanghai (CN); Lu Lei, Shanghai (CN); Peter Jie Song, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 15/846,389

(22) Filed: Dec. 19, 2017

(65) Prior Publication Data

US 2018/0210537 A1 Jul. 26, 2018

(30) Foreign Application Priority Data

Dec. 21, 2016 (CN) .......................... 201611192952.3

(51) Int. Cl.
*G06F 1/3234* (2019.01)
*G06F 3/06* (2006.01)
*G06F 1/3221* (2019.01)
*G06F 17/11* (2006.01)
*G11B 19/26* (2006.01)

(52) U.S. Cl.
CPC .......... *G06F 1/3268* (2013.01); *G06F 1/3221* (2013.01); *G06F 3/0625* (2013.01); *G06F 17/11* (2013.01); *G11B 19/26* (2013.01); *G06F 3/0616* (2013.01)

(58) Field of Classification Search
CPC .................................................... G06F 1/3268
See application file for complete search history.

(56) References Cited

U.S. PATENT DOCUMENTS

| 8,201,000 B2 | 6/2012 | Boss et al. |
| 8,296,513 B1 | 10/2012 | Liu |
| 8,327,170 B2 | 12/2012 | Boss et al. |
| 9,143,392 B2 | 9/2015 | Duchesneau |

(Continued)

FOREIGN PATENT DOCUMENTS

| CN | 101040252 | 9/2007 |
| CN | 101446857 | 6/2009 |

(Continued)

*Primary Examiner* — Paul Yen
*Assistant Examiner* — Eric Chang
(74) *Attorney, Agent, or Firm* — BainwoodHuang

(57) ABSTRACT

A method of controlling a hard disk and an electronic device, comprising: determining a number of power cycles that have been completed by the hard disk at a time point within a predetermined period of time, a power cycle including a total duration of the hard disk in a spin-on mode and an immediately neighboring spin-off mode; and in response to the number of power cycles that have been completed being below an upper limit number for the power cycles of the hard disk in the predetermined period of time, determining remaining time of the predetermined period of time starting from the time point, and determining, based on the remaining time, the number of power cycles that have been completed, and the upper limit number, a threshold idle duration for controlling the hard disk to enter the spin-off mode.

21 Claims, 8 Drawing Sheets

(56) References Cited

U.S. PATENT DOCUMENTS 9,317,212 B2     4/2016   Huffman et al.
2016/0103481 A1*   4/2016   Griffith ................ G06F 1/3296
                                                                                           713/323

FOREIGN PATENT DOCUMENTS

CN         101504568       8/2009
CN         104750434       7/2015

* cited by examiner

METHOD OF CONTROLLING HARD DISK AND ELECTRONIC DEVICE

RELATED APPLICATIONS

This application claim priority from Chinese Patent Application Number CN201611192952.3, filed on Dec. 21, 2016 at the State Intellectual Property Office, China, titled "METHOD FOR CONTROLLING HARD DISKS AND ELECTRONIC DEVICE" the contents of which is herein incorporated by reference in its entirety.

FIELD

Embodiments of the present disclosure generally relate to storage technologies, and more specifically, relate to a method of controlling a hard disk and an electronic device.

BACKGROUND

Elastic Cloud Storage offers a wide range of data storages. Elastic Cloud Storage uses latest trends in software architecture and development to achieve outstanding scalability, availability, and performance, and can build up easily, based on the above, a nearline storage system to store relatively cold data (namely, relatively less access to the data).

For a storage system such as a nearline storage system or an archive storage system, the density of storage resources is usually very high compared with the CPU, memory and other resources in the system. In recent years, the price ratio of a solid storage disk (SSD) to a hard disk (i.e., hard disk drive, HDD) has decreased significantly, however; there are still a few times price differences between them per TB. Hence, in order to save hardware cost, hard disks are still used in nearline storage systems or archive storage systems. The power consumption of hard disks, when all of them are in active mode, could be higher than 70% of the total power consumption of the whole storage system, and the percentage may vary from system to system.

Due to high power consumption of hard disks, in order to save total power consumption, it is very important to save power consumed by hard disks. Further, in order to reduce the power consumed by hard disks, it is very important to keep as many hard disks as possible in spin-off mode and keep the spin-off time as long as possible. In the spin-off mode, a spinning speed of a hard disk substantially drops, and even the hard disk almost stops spinning, thereby the power consumed by the hard disk can be saved. In contrast to the spin-off mode, the hard disk operates normally at a normal spinning speed in a spin-running mode.

SUMMARY

Generally, embodiments of the present disclosure provide a method of controlling a hard disk and an electronic device.

In a first aspect, embodiments of the present disclosure provide a method of controlling a hard disk. The method comprises: determining a number of power cycles that have been completed by the hard disk at a time point within a predetermined period of time, a power cycle including a total duration when the hard disk is in a spin-on mode and an immediately neighboring spin-off mode; and in response to the number of power cycles that have been completed being below an upper limit number for the power cycles of the hard disk in the predetermined period of time, determining remaining time of the predetermined period of time starting from the time point, and determining, based on the remaining time, the number of power cycles that have been completed, and the upper limit number, an threshold idle duration for controlling the hard disk to enter the spin-off mode.

In a second aspect, embodiments of the present disclosure provide an electronic device. The electronic device comprises: a processor; and a memory that is coupled to the processor and stores instructions to be executed by the processor, the instructions, when executed by the processor, causing the apparatus to perform acts, the acts comprising: determining a number of power cycles that have been completed by a hard disk at a time point within a predetermined period of time, a power cycle including a total duration when the hard disk is in a spin-on mode and an immediately neighboring spin-off mode; and in response to the number of power cycles that have been completed being below an upper limit number for the power cycles of the hard disk in the predetermined period of time, determining remaining time of the predetermined period of time starting from the time point, and determining, based on the remaining time, the number of power cycles that have been completed, and the upper limit number, an threshold idle duration for controlling the hard disk to enter the spin-off mode.

In a third aspect, embodiments of the present disclosure provide a computer program product. The computer program product is tangibly stored on a non-transitory computer readable medium and comprises machine-executable instructions which, when executed, cause a machine to perform steps of the method for controlling a hard disk according to the first aspect of the present disclosure.

It will be understood from the following description that, according to embodiments of the present disclosure, an adaptive method for deciding when a hard disk should enter a spin-off mode to save power may be used to solve the problem about saving the power of the hard disk. To this end, the present disclosure provides a generic method for adaptively deciding when a hard disk should enter a spin-off mode to save power consumption. By applying the generic method to nearline storages system based on ECS, better power saving as compared with the prior art can be achieved.

It should be understood that the content described in the Summary of Invention is not intended to limit key features or essential features of embodiments of the present disclosure, nor is it intended to limit the scope of the present disclosure. Other features of the present disclosure will become readily apparent from the following depictions.

BRIEF DESCRIPTION OF THE DRAWINGS

The foregoing and other features, advantages and aspects of various embodiments of the present disclosure will become more apparent in conjunction with the accompanying drawings and with reference to the following detailed description. In the drawings, like or similar reference numerals refer to like or similar elements, wherein.

In all drawings, like or similar reference numerals refer to like or similar elements.

DETAILED DESCRIPTION OF EMBODIMENTS

Figure 1:
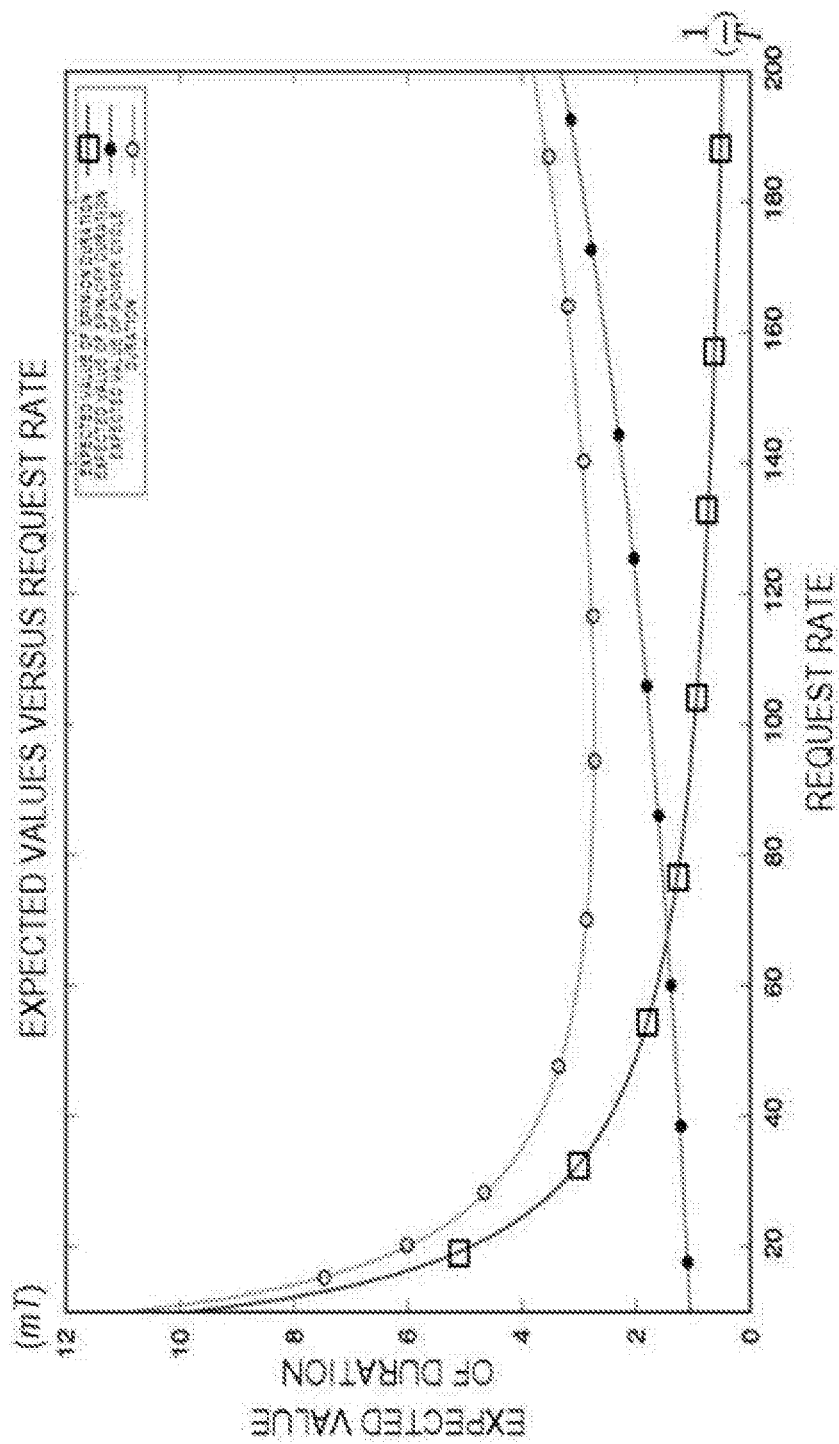
FIG. 1 is a curve diagram of expected values of a spin-on duration, a spin-off duration, and a power cycle duration in contrast to a data read request rate for a hard disk.

Embodiments of the present disclosure will be described in more detail below with reference to the accompanying drawings. While some embodiments of the present disclosure are shown in the drawings, it should be understood that, the present disclosure may be embodied in various forms and should not be construed as being limited to the embodiments as set forth herein. Rather, these embodiments are provided for the purpose of understanding the present disclosure more thorough and complete. It should be understood that, the drawings and examples of the present disclosure are provided merely for illustrative purposes and are not intended to limit the scope of the present disclosure.

As used herein, the term "comprise" and its variants are inclusive, i.e. "including but not limited to." The term "based on" means "at least partially based on." The term "one embodiment" means "at least one embodiment;" the term "another embodiment" means "at least one further embodiment." The relevant definitions of other terms are given in the following description.

SUMMARY

In the present disclosure, a nearline storage system is taken as an example to illustrate a method for controlling a hard disk and an electronic device in some embodiments of the present disclosure. It should be understood that embodiments disclosed in the present disclosure are not only adapted for the nearline storage system, but are also adapted for various storage systems.

Data ingress to a nearline storage system (that is, data writing to the system) is usually well controlled by a upper tier system which holds hotter data (namely, data which are accessed more) and moves some data to the nearline system when said some data become colder, so the data ingress is in burst and happens in short windows periodically, which means the disk up time to serve ingress traffic in a nearline system is usually relatively fixed and it is difficult to operate on it to save power.

Data egress from a nearline storage system (that is, data reading from the system), however, is usually not periodical and the happening time of the data egress is difficult to control. This is especially true for systems for building up cloud. In these systems, data egress traffic eventually sources from various applications which are connected to the cloud, and the data egress traffic depends on the behaviors of end users and fully out of the control of cloud infrastructure controllers.

There are efforts in predicting the egress load pattern for a nearline storage system, but in general it is very difficult to build a model for load pattern, and the model needs to be updated from time to time and therefore causes an "online learning" problem. Meanwhile, this model is likely to lead to way off load anticipation from a correct or proper result. Some other prediction methods are used to help setup of non-distributed storage systems, for example, predicting load to hard disks based on CPU usage. However, these prediction methods are too simple to solve the problems in the nearline storage system, because the information used to do the prediction is not available for example in distributed and tiered setup of the nearline storage system. As a result, the data egress load is often deemed as unpredictable for nearline systems.

As stated above, since data writing to a hard disk usually happens periodically under control of a upper tier system, the present disclosure mainly considers problems regarding data reading. Hence, special thoughts will not be given to the data writing in subsequent content, but will be given to controlling the hard disk with respect to data reading.

With the assumption that the load pattern is unpredictable, it is common to set up a fixed threshold idle time for a hard disk. If the hard disk does not receive any data read request upon completion of the threshold idle time, the hard disk enters a spin off mode till next data read request comes. In the context of the present disclosure, the duration of the threshold idle time is called as threshold idle duration.

However, in practice, the threshold idle duration could not be set too short for a couple of reasons. When hard disk is up from the spin-off model, much higher power consumption is required in a short period to spin up the hard disk. Since a too short threshold idle duration causes the number of power cycles to be too large (that is, the hard disk switches between the spin-on mode and the spin-off mode too frequently), the too short threshold idle duration is not going to save power but to consume more power. It should be understood that in the context of the present disclosure, a power cycle refers to a time period in which the hard disk enters the spin-on mode, switches from the spin-on mode to the spin-off mode and then enters the spin-off mode again. In other words, a power cycle refers to a time period in which the hard disk is in the spin-on mode one time and then immediately in the spin-off mode one time. It should be understood that it is possible to define a power cycle as a time period in which the hard disk is first in the spin-off mode one time and then immediately in the spin-on mode one time, without affecting implementation of the method for controlling the hard disk and the electronic device disclosed in the present disclosure and effects thereof.

A normal service life of a hard disk can be ensured only when the number of power cycles in a certain period is less than a certain number in the hard disk's service life. Therefore, too frequent switching of a hard disk between the spin-on mode and spin-off mode might lead to hard disk failure prematurely and means much higher cost due to increased hard disk replacing rate. For example, a certain hard disk designed for archiving systems can only guarantee that Mean Time Between Failure (MTBF) will not increase if the power cycle number per year is less than 10,000.

In view of the above, the threshold idle duration is usually set to control the maximum possible power cycle numbers in a certain time period.

Therefore, the method for controlling the hard disk and the electronic device disclosed in the present disclosure mainly involve determining the threshold idle duration for controlling the hard disk to enter the spin-off mode. For the sake of easy discussion, hereunder a method for calculating the threshold idle duration is described completely first, and then the method for controlling the hard disk and the electronic device in some embodiments of the present disclosure are described respectively.

A Method for Calculating the Threshold Idle Duration

Upon determining the threshold idle duration, the worst situations that might happen need to be taken into consideration. Generally speaking, it is believed that the toughest data read load situation is that data read happens at fixed rate, this is because if the average number of data read is not kept the same but let the data read load be light for some period, then in that period there will be more chances for a hard disk to enters the spin-off mode and the time of spin-off might be kept for longer, which in general leads to better power saving. Therefore, how to calculate and determine the threshold idle duration in a tough situation will be discussed based on the assumption that the data read happens at a fixed rate.

Assume there are N hard disks per node and the data read load (namely, data read request) to each node is at fixed interval T. The term "node" used here may include but not limited to a disk array. For each data read request, one hard disk among the N hard disks will be accessed randomly to serve the data read request, wherein N is a natural number greater than or equal to 2. Without loss of generality, assume that the first data read request happens at time 0. At this time, for any certain hard disk, at time kT, where k is positive integer, the probability for the hard disk to get a read is $$\frac{1}{N},$$

while the probability for the hard disk not to get a read is $$\frac{N-1}{N}.$$

Regarding the above-mentioned definition of the threshold idle duration, if a hard disk is set to enters the spin-off mode after mT time in which the data read request is not received, where m is a positive integer, mT is the threshold idle duration for controlling the hard disk to enter the spin-off mode. Since time is re-counted so long as read happens in any mT, it is possible to assume a length (namely, spin-on duration of the hard disk) of the hard disk spin-on time period (namely, a time period of the spin-on mode of the hard disk, from last switch from the spin-off mode to the spin-on mode to entry into the spin-off mode next time) to be umT (u is a number greater than or equal to 1), an expected value E(umT) of umT is determined according to the following formula (1):

$$E(umT) = \sum_{i=1}^{m} \frac{1}{N}\left(\frac{N-1}{N}\right)^{i-1}(E(umT) + iT) + mT\left(\frac{N-1}{N}\right)^m \quad (1)$$

$$= \left(1 - \left(\frac{N-1}{N}\right)^m\right)E(umT) + NT\left(1 - \left(\frac{N-1}{N}\right)^m\right)$$

In the formula (1), $$mT\left(\frac{N-1}{N}\right)^m$$

represents a case in which the spin-on duration of the hard disk is an integer times of the mT (namely, u is an integer), whereas $$\sum_{i=1}^{m} \frac{1}{N}\left(\frac{N-1}{N}\right)^{i-1}(E(umT) + iT)$$

represents other cases.

On the basis of the above formula (1), an expected value E(u) of u may be determined according to the following formula (2):

$$E(u) = \frac{N}{m}\left(\left(\frac{N}{N-1}\right)^m - 1\right) \quad (2)$$

It may be easy to know that E(u) increases with m according to the formula (2) and by checking the Taylor series of E(u). Since m is the number of data reads per node in the threshold idle time corresponding to the threshold idle duration mT, the formula (2) aligns with the intuition that if the number of data reads per node within threshold idle time increases, then the average period of time for a hard disk's spin-on time will also be longer.

Then, assume a length (namely, spin-off duration of the hard disk) of the hard disk spin-off time period (namely, a time period of the spin-off mode of the hard disk, from restoration from the rotation spin-on mode to the spin-off mode last time to entry into the spin-on mode next time) to be dmT (d is a positive number), an expected value E(dmT) of dmT is determined according to the following formula (3):

$$E(dmT) = \sum_{i=1}^{+\infty} \frac{iT}{N}\left(\frac{N-1}{N}\right)^{i-1} \quad (3)$$

$$= NT$$

Then, an expected value E(d) of d may be determined according to the following formula (4):

$$E(d) = \frac{N}{m} \quad (4)$$

It may be understood that E(d) is going to decrease as m increases, so formula (4) also aligns with the intuition that if the number of reads per node within threshold idle time increases, then the average period of time for a hard disk's spin-off time will also be shorter.

Adding the expected value E(umT) of umt and the expected value E(dmT) of dmT can get an expected value of duration of one power cycle of a hard disk, this means if the threshold idle duration is set as mT, the expected value of power cycle length is $$\frac{N}{m}\left(\frac{N}{N-1}\right)^m$$

times of mT.

A minimal value of the expected value of the power cycle length may be calculated based on the above formula for calculating the expected value of the power cycle length, and it may be calculated through the function $$\inf_{m,N} \frac{N}{m}\left(\frac{N}{N-1}\right)^m,$$

wherein inf represents an operation of solving a lower bound. Because the function is a convex function, when the value of N is fixed, it is easy to know the minimum value will be achieved when $$\frac{\partial}{\partial m}\left(\frac{N}{m}\left(\frac{N}{N-1}\right)^m\right) = 0,$$

that is, the minimum value will be achieved when $$m = \frac{1}{\ln\frac{N}{N-1}},$$

and the expected power cycle length at that point is mT multiplying $$\left(\frac{N}{N-1}\right)^{\frac{1}{\ln\frac{N}{N-1}}} N\ln\frac{N}{N-1} = eN\ln\frac{N}{N-1}.$$

Very obviously, the expected value of the power cycle length decreases when N increases, and $$\lim_{N\to\infty} eN\ln\frac{N}{N-1} = e,$$

where e is a natural constant, namely, the base of natural logarithm. Thus, the lower bound of expected value of the power cycle length is e times of mT. which is the most ideal power cycle length.

In other words, no matter how the data read load of the hard disk changes, the minimal value of the expected value for one power cycle length equals to e times the threshold idle duration for the hard disk to enter the spin-off mode.

FIG. 1 is a curve diagram showing expected values of a spin-on duration, a spin-off duration, and a power cycle duration in contrast to a data read request rate for the hard disk, wherein the curve with "□" thereon is a curve diagram of the expected value of the spin-on duration changing with the increase of the data read request rate for the hard disk, the curve with "●" thereon is a curve diagram of the expected value of the spin-off duration changing with the increase of the data read request rate for the hard disk, and the curve with "○" thereon is a curve diagram of the expected value of the power cycle duration changing with the increase of the data read request rate for the hard disk. In FIG. 1, the unit of the transverse axis is $$\frac{1}{T},$$

and the unit of the longitudinal axis is the threshold idle duration of the hard disk, namely, mT. As shown in FIG. 1, since the value of the natural constant e is about 2.71828, the lowest point (namely, the minimal value) of the curve of the power cycle duration shown in FIG. 1 is e times mT.

As stated above, the lower bound of the expected value of the power cycle duration is e times mT. Thus, for a relatively long period of time D, if a hard disk could tolerate up to P power cycles in D, P may be understood as the upper limit number of the power cycles in the period of time D, and it may be known from the formula ePmT=D that the threshold idle duration can be set to be shortest, namely, $$mT = \frac{D}{eP}.$$

At this time, statistically, the number of the power cycles happening in the period of time D is still within the limitation of the upper limit number P. If it is considered that nearline storage system is expected to get lighter dart read load than the worst situation, the threshold idle duration can be set even shorter such that the threshold idle duration in the case of the lighter data read load can be properly biased to achieve a better power-saving effect. However, the drawback of so doing lies in that if there is relatively high data read load, the short threshold idle means it is possible to have a number of power cycles in D much higher than P.

Based on the analysis above, the generic idea proposed by the present disclosure is to adaptively adjusting the threshold idle duration for the hard disk to enter the spin-off mode. This may be performed through the following formula (5), wherein formula (5) is a function defined in the interval [0,D] for determining the threshold idle duration at time t, $$I(t) = \begin{cases} f(t \mid D, P, c(t)) & \text{if } c(t) < P \\ +\infty & \text{if } c(t) = P \end{cases} \quad (5)$$

Where I(t) represents the threshold idle duration at time t, and c(t) represents the number of power cycles that happened during the interval [0,D]. In the formula (5), when the value of c(t) reaches P, this indicates that no more power cycles can be permitted in the period of time D, namely, the hard disk cannot be permitted to enter the spin-off mode again, so the value of I(t) is set to +∞. At this time, the disk will not enter the spin-off mode again in the process from the current time t until completion of the period of time D, and therefore no more power cycles will be produced. In other words, c(t)≤P is always true for t∈[0, D], that is, the number of power cycles produced during the period of time D will not exceed the upper limit number P of the power cycles.

However, it should be understood that setting the value of I(t) to be +∞ as stated above is only exemplary, and is not to limit the embodiments of the present disclosure. In order to achieve the effect that the disk will not enter the spin-off mode again in the process from the current time t until completion of the period of time D, it is also possible to only set the value of I(t) to be greater than the duration from the current time t until completion of the period of time D. meanwhile, more generally, it is also possible to simply set the hard disk not to enter the spin-off mode in the process from the current time t until completion of the period of time D.

Regarding the value of I(t), a lower bound, namely, an preset threshold idle duration $I_{min}$ may also be optionally set.

When the value of I(t) as calculated at a certain time t is below $I_{min}$, the value of I(t) may be set as $I_{min}$. The purpose of setting $I_{min}$ is to avoid too short threshold idle duration for the hard disk calculated in extreme cases. These extreme cases include but not limited to the following cases: if the hard disk fails to receive a read request in a certain time period in the period of time D, the number of remaining available power cycles upon approaching the completion of the period of time D is relatively greater, and the value of I(t) determined through the formula (5) might be shorter at this time, thereby possibly affecting the power-saving effect as stated above.

The following formula (6) may be obtained by applying formula (5) to the ECS-based nearline storage system:

$$I(t) = \begin{cases} \max\left(\frac{D-t}{\lambda(P-c(t))}, I_{min}\right) & \text{if } c(t) < P \\ +\infty & \text{if } c(t) = P \end{cases} \quad (6)$$

Where $I_{min}$ represents the preset threshold idle duration, and $\lambda$ represents a coefficient of a scaling factor. The value of $\lambda$ is greater than or equal to e.

Since determining an initial value of the threshold idle duration is a special case of determining the threshold idle duration, it is known from the above formula (6) that when initially t=0, formula (6) varies into $$I(0) = \frac{D}{\lambda P},$$

wherein the value of I(0) is the initial value of the threshold idle duration.

As known from analysis of the above formula (6) and relevant formulas, considering that the hard disk, when start running, may tolerate all P power cycles in the whole period of time D, the threshold idle duration is set to prepare for the worst case where the expected value of the power cycle duration is $\lambda$ times of the threshold idle duration. Then, as time passes, the actual power cycles happened in the hard disk is counted and the number of the remaining tolerable power cycles until the period of time D ends is P-c(t). Depending on the load, it is possible to have power cycles consumed quicker or slower than the initially-calculated threshold idle duration (namely, the initial value of the threshold idle duration), and the threshold idle duration can be adaptively adjusted based on the number of the remaining tolerable power cycles.

Example Processes

Figure 2:
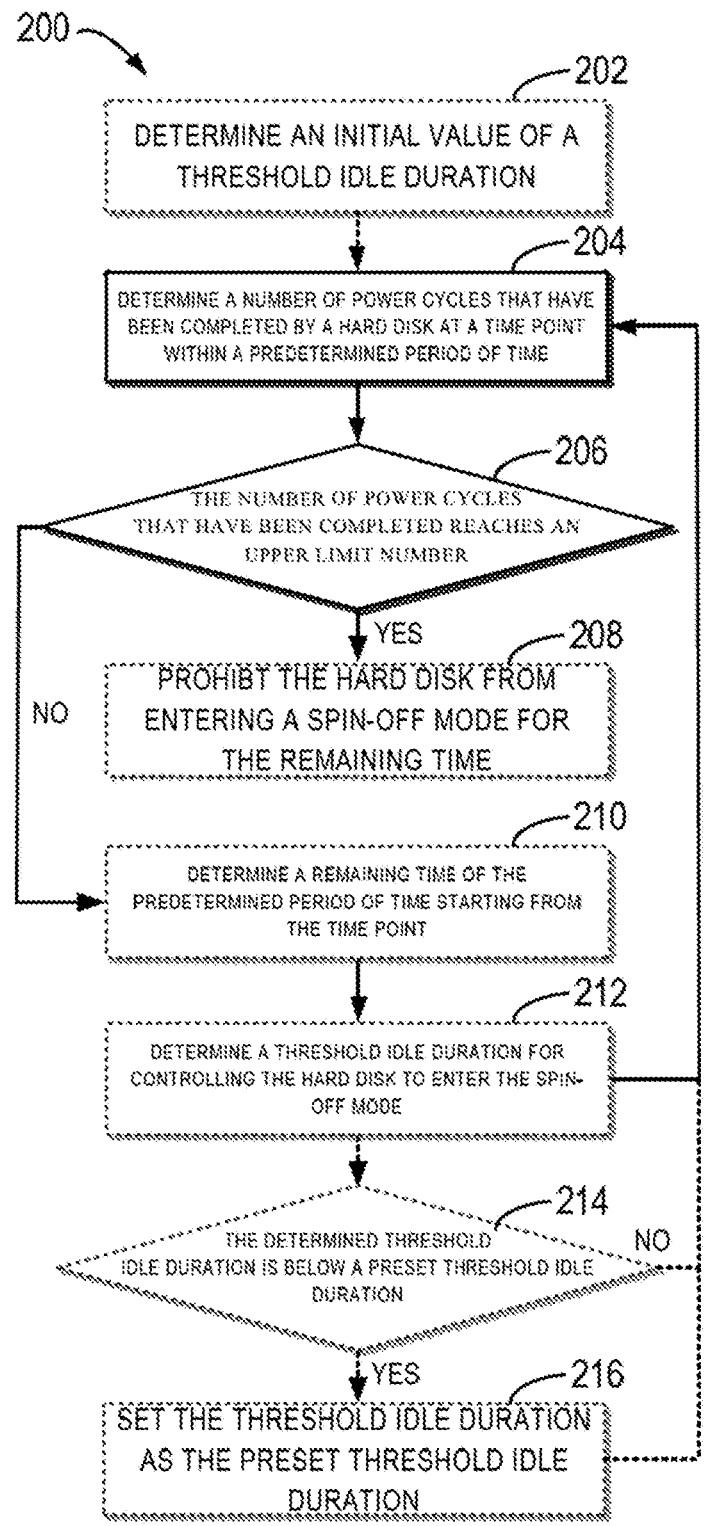
FIG. 2 shows a method 200 for controlling a hard disk in some embodiments.

FIG. 2 shows a method 200 for controlling a hard disk in some embodiments. The method 200 shown in FIG. 2 mainly involves determining a threshold idle duration for controlling the hard disk to enter a spin-off mode. A specific process of the method 200 is described in detail respectively with respect to actions of the method 200.

It is noted that in FIG. 2, actions corresponding to blocks shown by dotted lines are optional. That is to say, in some embodiments, one or more of these actions may be omitted. Furthermore, in some embodiments, some actions not shown in FIG. 2 may be performed.

As shown in the figure, at 202, an initial value of the threshold idle duration for controlling the hard disk to enter the spin-off mode is determined. Since the hard disk needs to have a duly-set threshold idle duration after operation begins, the initial value of the threshold idle duration needs to be determined when the hard disk beings to operate.

As stated above, the initial value of the threshold idle duration may be determined through the formula $$I(0) = \frac{D}{\lambda P},$$

wherein D represents a total duration of a predetermined period of time, and P represents the upper limit number of power cycles of the hard disk in the predetermined period of time D.

It should be understood that the action performed at 202 is to determine the initial value of the threshold idle duration. Since the initial value of the threshold idle duration may be set by presetting a default value (e.g., upon production of the hard disk or before out of the factory), 202 is not requisite, and therefore 202 is shown by dotted line in FIG. 2. For example, when the initial value of the threshold idle duration has been preset, 202 may be omitted.

At 204, a number of power cycles that have been completed by the hard disk at a time point t in the predetermined period of time D is determined. In some embodiments, the action in 204 may be achieved by setting a counter in the hard disk or the storage system. Once the hard disk completes one power cycle in the predetermined period of time D, the value of the counter increases by one, so that whenever the counter is looked up at any time t, the number of power cycles that have been completed at this time may be determined immediately.

At 206, whether the number of power cycles that have been completed reaches the upper limit number P is determined. It can be known according to formula (5) and formula (6), once the number of power cycles that have been completed reached (is equal to) the upper limit number P, different subsequent operations need to be performed. Therefore, 206 is a judgment step, and the flow enters 208 and 210 respectively according to different judgment results.

In order to ensure the number of power cycles that have been completed does not exceed the upper limit number P, at least two manners may be employed to implement.

In one manner, the value of the counter may be monitored in real time, and once the value of the counter reaches the upper limit number P, it can be immediately determined that the number of power cycles that have been completed reaches the upper limit number P.

In another manner, the value of the counter may be invoked at an interval of time period. To avoid the number of power cycles during the above-mentioned time period from increasing by two or more, the duration set in the time period may be set to be below the threshold idle duration calculated last time plus the aforesaid fixed interval T. This is because after the hard disk fails to receive a hard disk read request in the threshold idle duration and then enters the spin-off mode, it is needed to at least pass the fixed interval T to receive another hard disk read request. Thus, in actual operations, the minimal value of a power cycle is the threshold idle duration calculated last time plus the fixed interval T the threshold idle duration calculated last time plus the aforesaid fixed interval T At this time, it is also possible to ensure the value of the counter will not exceed the upper limit number P whenever the value of the counter is invoked.

In 206, if it is determined that the number of power cycles that have been completed has reached the upper limit number P, a proper operation is performed to prohibit the hard disk from entering the spin-off mode for the remaining time. As stated above, it is possible to prohibit the hard disk from entering the spin-off mode for the remaining time by setting the threshold idle duration to be greater than the duration of the remaining time till +∞. However, in some embodiments, it is also possible to prohibit the hard disk from entering the spin-off mode for the remaining time only by an operation such as disabling the threshold idle duration.

In another aspect, if it is determined in 206 that the number of power cycles that have been completed has not yet reached the upper limit number, the remaining time of the predetermined period of time D starting from the time point t is determined in 210. As stated above, the calculation may be performed simply through D–t, and will not be detailed any more here.

In 212, the threshold idle duration for controlling the hard disk to enter the spin-off mode is determined based on the remaining time, the number of power cycles that have been completed, and the upper limit number.

As stated above, in some embodiments, the value of the threshold idle duration at this time point may be determined through the formula $$I(t) = \frac{D-t}{\lambda(P - c(t))},$$

wherein t represents the duration from the beginning of the predetermined period of time D to the time point.

Since the method for controlling the hard disk according to the present disclosure is intended to adaptively adjust the threshold idle duration, after determining the value of the threshold idle duration at this time point, the flow returns to 204 to continue to determine a value of the threshold idle duration at subsequent time points.

Optionally, the flow may proceed to 214 after determining the value of the threshold idle duration at this time point.

In 214, whether the value of the threshold idle duration determined in 212 is below the preset threshold idle duration $I_{min}$ is determined. As stated above, the purpose of setting the threshold idle duration $I_{min}$ is to avoid too short threshold idle duration for the hard disk calculated in extreme cases. Therefore, 206 is a judgment step, and the flow may proceed to 204 and 216 according to different judgment results.

In 214, if it is determined that the value of the threshold idle duration determined in 212 is below the preset threshold idle duration $I_{min}$, the value of the threshold idle duration determined in 212 is set as the preset threshold idle duration $I_{min}$ in 216.

Meanwhile, as stated above, since the method for controlling the hard disk according to the present disclosure is intended to adaptively adjust the threshold idle duration, after setting the value of the threshold idle duration determined in 212 as the preset threshold idle duration $I_{min}$, the flow returns to 204 to continue to determine the value of the threshold idle duration at subsequent time points.

In a further aspect, if it is determined in 214 that the value of the threshold idle duration determined in 212 is greater than or equal to the preset threshold idle duration $I_{min}$, the flow returns to 204 to continue to determine the value of the threshold idle duration at subsequent time points.

It should be understood that the actions performed at 214 and 216 aim to avoid too short threshold idle duration for the hard disk calculated in extreme cases, so they are not requisite, and therefore they are shown by dotted line in FIG. 2. For example, the preset minimal value may not be set for the threshold idle duration to save the calculating costs. In these cases, both 214 and 216 may be omitted.

Example Apparatuses

Figure 3:
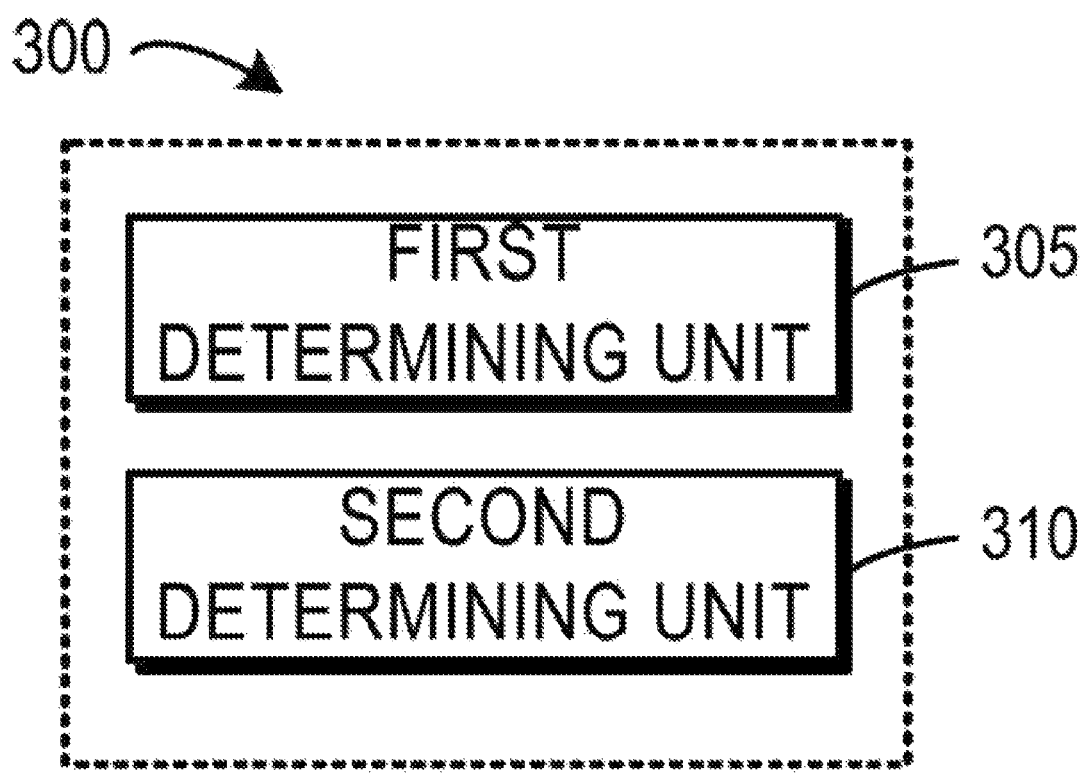
FIG. 3 shows a block diagram of an apparatus 300 in some embodiments.

FIG. 3 shows a block diagram of an apparatus 300 in some embodiments. As shown in FIG. 3, the apparatus 300 comprises: a first determining unit 305 configured to determine a number of power cycles that have been completed by a hard disk at a time point in the predetermined period of time, a power cycle including a total duration of a spin-on mode and an immediately neighboring spin-off mode of the hard disk; and a second determining unit 310 configured to, in response to the number of power cycles that have been completed being below an upper limit number for the power cycles of the hard disk in the predetermined period of time, determine remaining time of the predetermined period of time starting from the time point, and determine, based on the remaining time, the number of power cycles that have been completed, and the upper limit number, an threshold idle duration for controlling the hard disk to enter the spin-off mode.

In some embodiments, the apparatus 300 may further comprise a prohibiting unit configured to prohibit, in response to the number of power cycles that have been completed being equal to the upper limit number, the hard disk from entering the spin-off mode for the remaining time.

In some embodiments, the prohibiting unit may further comprise a setting unit configured to set the threshold idle duration to be greater than the duration of the remaining time.

In some embodiments, the second determining unit 310 may further comprise a third determining unit configured to determine the threshold idle duration as $$I(t) = \frac{D-t}{\lambda(P - c(t))},$$

wherein I(t) is the threshold idle duration at the time point, D is a total duration of a predetermined period of time, t is a duration from the beginning of the predetermined period of time to the time point, λ is a coefficient, P is the upper limit number, and c(t) is the number of power cycles that have been completed at the time point.

In some embodiments, the apparatus 300 may further comprise a fourth determining unit configured to determine the initial value of the threshold idle duration as $$I(0) = \frac{D}{\lambda P},$$

wherein I(0) is the initial value, D is a total duration of the predetermined period of time, λ is a coefficient, and P is the upper limit number.

In some embodiments, in the third determining unit or fourth determining unit, a value of λ is configurable.

In some embodiments, in the third determining unit or fourth determining unit, the coefficient is greater than or equal to a natural constant e.

In some embodiments, the apparatus 300 may further comprise a setting unit configured to set, in response to the determined threshold idle time limit being below the preset threshold idle duration, the threshold idle duration as the preset threshold idle duration.

It should be understood that each unit disclosed in the apparatus 300 respectively corresponds to each step in the method 200 described with reference to FIG. 2. Hence, operations and features described above in conjunction with FIG. 1 and FIG. 2 are also adapted for the apparatus 300 and units included therein, and have the same effects. Specific details are not detailed any more here.

Units included in the apparatus 300 may be implemented in various manners, including software, hardware, firmware and any combination thereof. In an embodiment, one or more units may be implemented using software and/or firmware, e.g., machine executable instructions stored in a storage medium. In addition to the machine-executable instructions or alternatively, all or partial units in the apparatus 300 may be at least partially implemented by one or more hardware logic components. Exemplarily and unrestrictively, hardware logic components in an exemplary type that may be used comprise a field-programmable gate arrays (FPGA), Application Specific Integrated Circuit (ASIC), Application Specific Standard Parts (ASSP), System on Chip (SOC), Complex Programmable Logic Device (CPLD), and the like.

Units of the apparatus 300 shown in FIG. 3 may be partially or totally implemented as hardware modules, software modules, firmware modules or any combinations thereof. Particularly, in some embodiments, the flow, method or process described above may be implemented by the base station or hardware in the terminal device. For example, the base station or terminal device may implement the method 200 by using its transmitter, receiver, transceiver and/or processor or controller.

Figure 4:
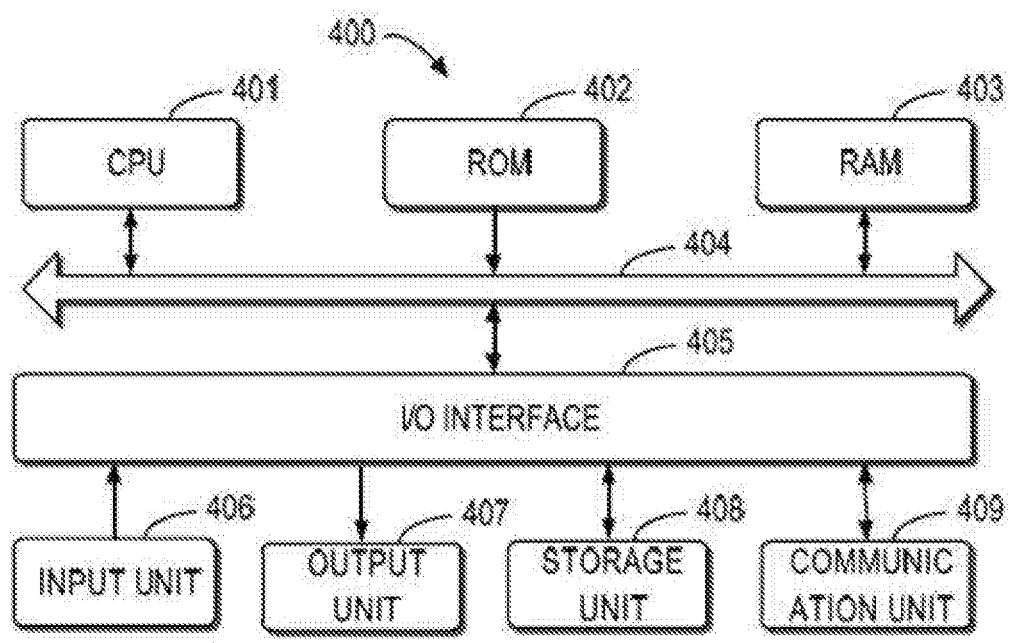
FIG. 4 shows a block diagram of an apparatus 400 that can be used for implementing embodiments of the present disclosure.
Figure 5:
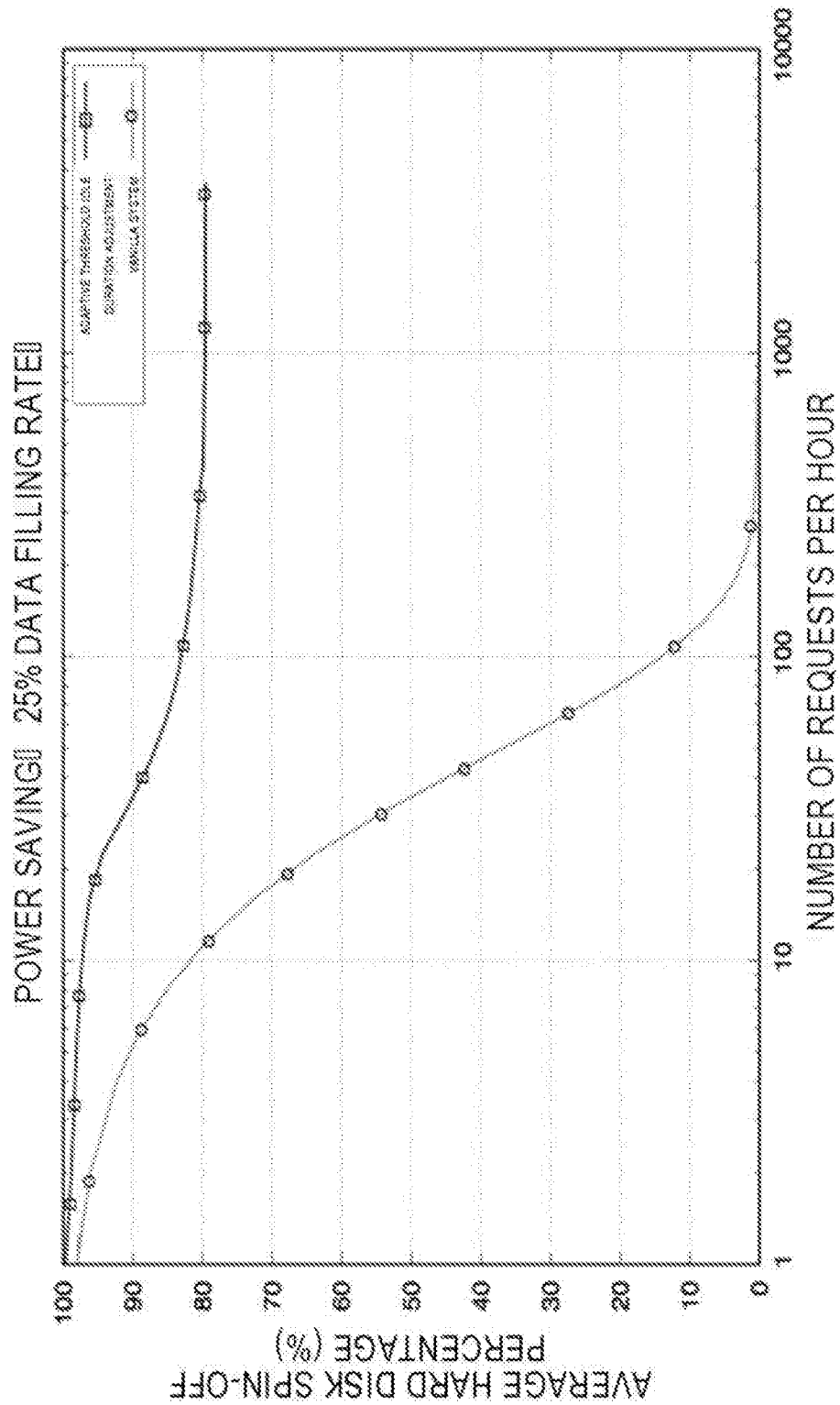
FIG. 5 shows a contrast curve diagram of power saving when a hard disk has a 25% data filling rate.
Figure 6:
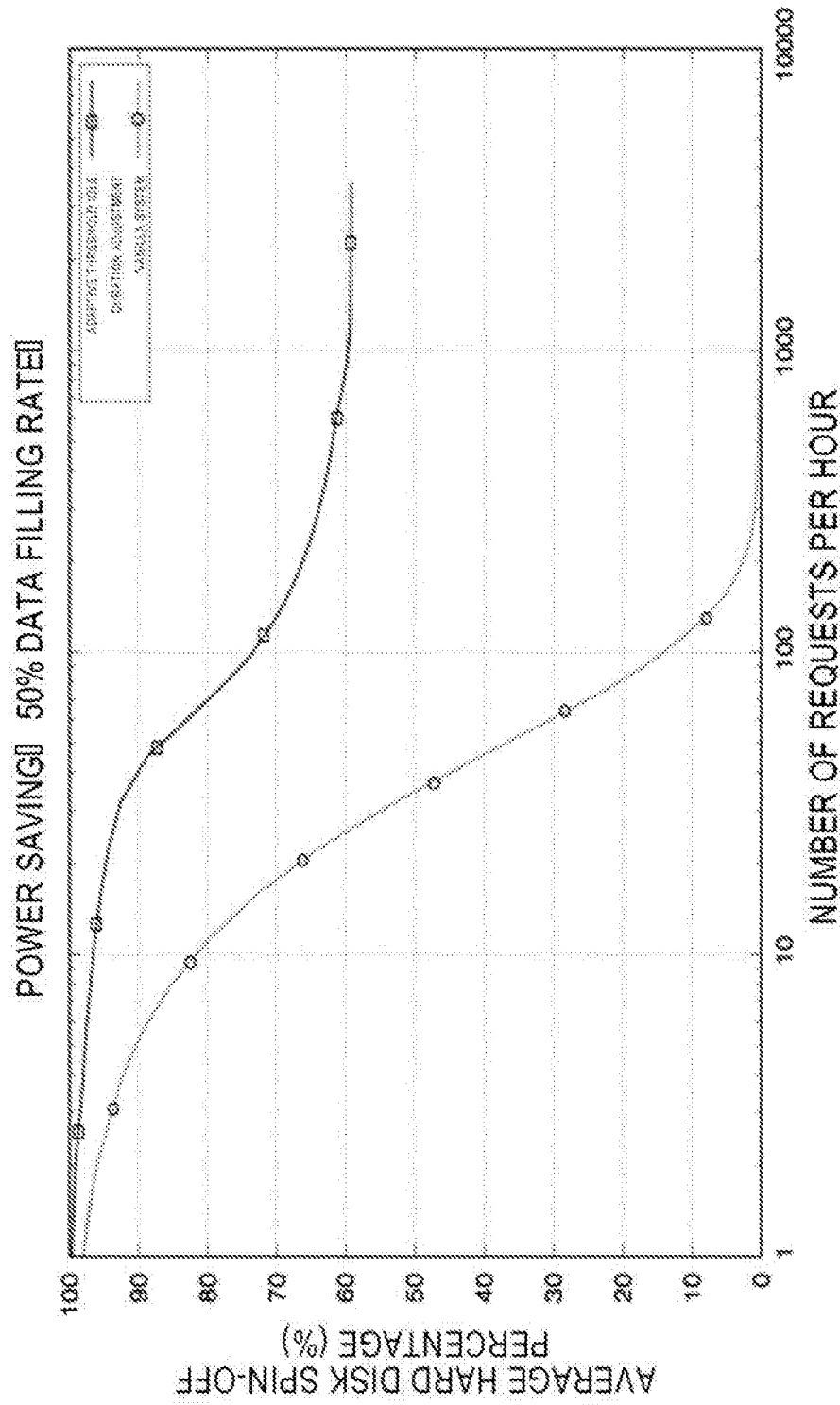
FIG. 6 shows a contrast curve diagram of power saving when a hard disk has a 50% data filling rate.
Figure 7:
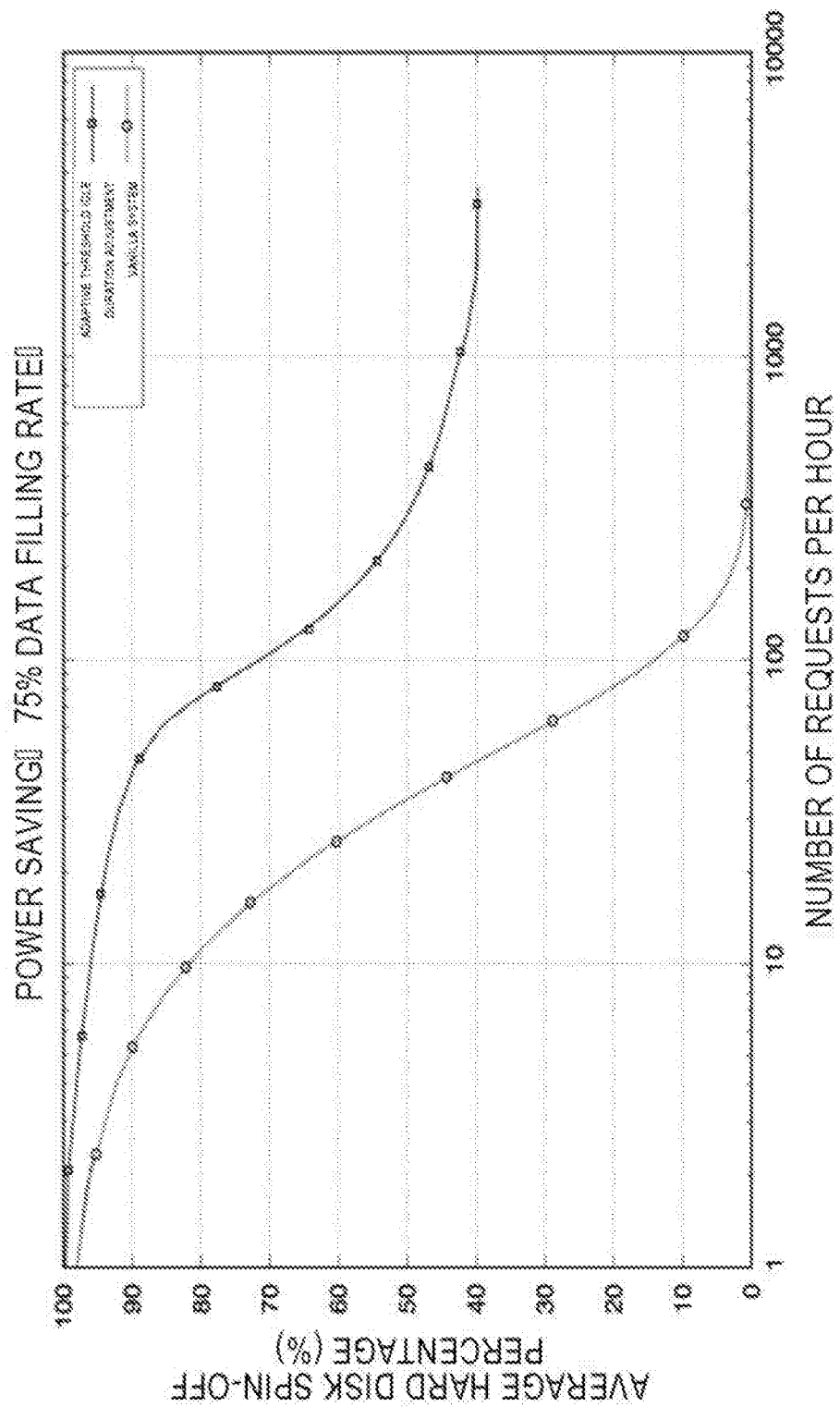
FIG. 7 shows a contrast curve diagram of power saving when a hard disk has a 75% data filling rate.
Figure 8:
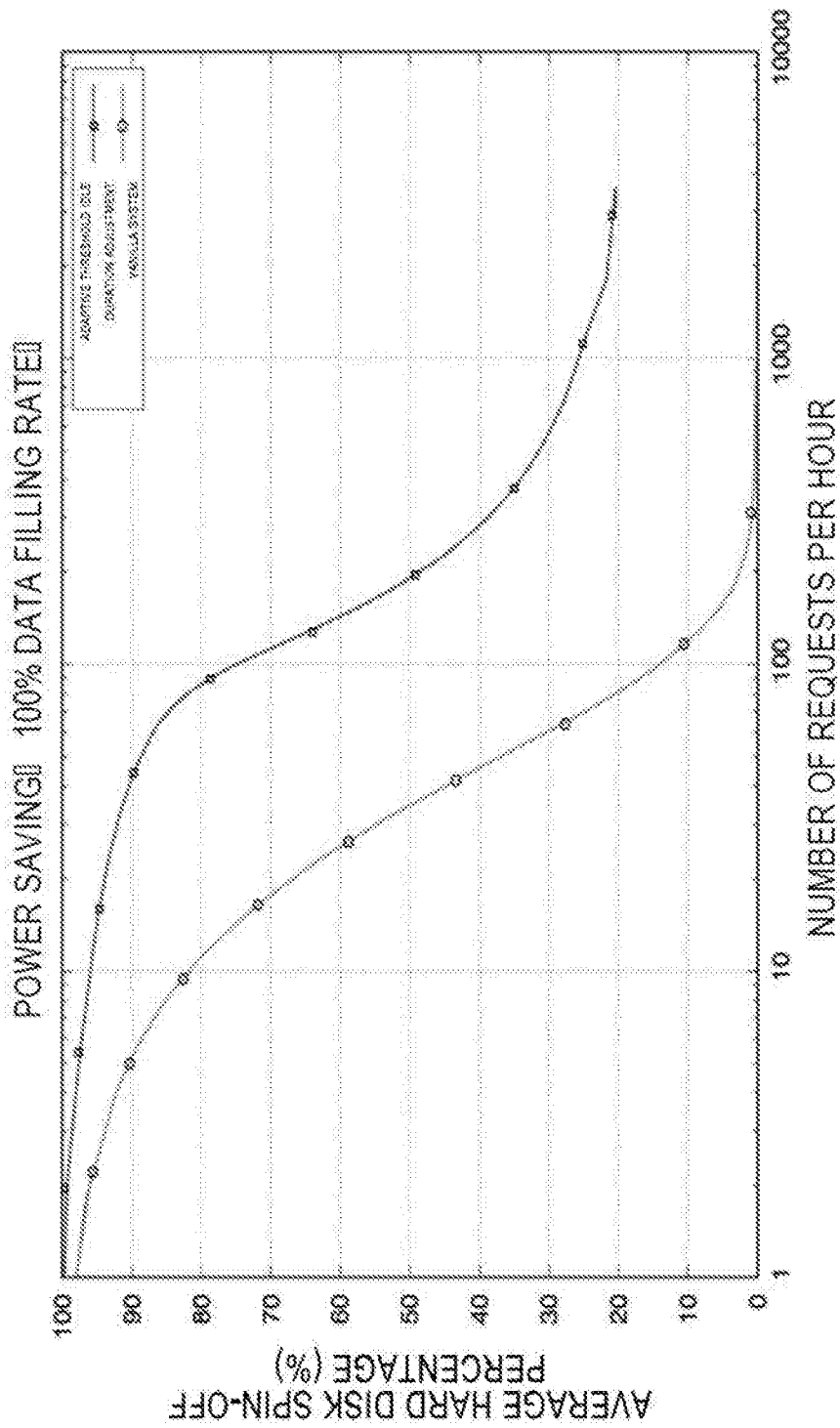
FIG. 8 shows a contrast curve diagram of power saving when a hard disk has a 100% data filling rate.

FIG. 4 shows a block diagram of a device 400 that can be used to implement embodiments of the present disclosure. The device 400 may be used to implement an electronic device which includes, for example, the electronic devices as described above. As shown, the device 400 includes a central processing unit (CPU) 401 which can execute a variety of appropriate actions and processes according to computer program instructions stored in a read-only memory (ROM) 402 or computer program instructions loaded from a storage unit 408 into a random-access memory (RAM) 403. Various programs and data required for the device 400 to operate can also be stored in the RAM 403. CPU 401, ROM 402, and RAM 403 are connected to each other via a bus 404. An input/output (I/O) interface 405 is also connected to the bus 404.

A plurality of components in the device 400 are connected to the I/O interface 405, including: an input unit 406, e.g., a keyboard, a mouse, and the like; an output unit 407, e.g., various types of displays, speakers, and the like; a storage unit 408, e.g., a magnetic disc, a compact disc, and the like; and a communication unit 409, e.g., a network card, a modem, a wireless communication transceiver, and the like. The communication unit 409 allows the device 400 to exchange information/data with other devices via a computer network such as the Internet and/or various telecommunication networks.

In some embodiments, the processing unit 901 may be configured to execute various processes and processing steps described above, e.g., method 200. For example, in some embodiments, the method 200 may be implemented as computer software programs that are tangibly included in a machine-readable medium (e.g., storage unit 408). In some embodiments, a part or all of the computer programs may be loaded and/or installed into the device 400 via the ROM 402 and/or the communication unit 409. When the computer program is loaded into the RAM 403 and executed by the CPU 401, one or more steps of the method 200 described above may be performed.

According to one embodiment of the present disclosure, there is also provided a computer program product. The computer program product is tangibly stored on a non-transitory computer readable medium and comprises machine-executable instructions which, when being executed, cause the machine to execute the steps of the method 200 according to the present disclosure.

Experiments and Effects

FIG. 5 to FIG. 8 illustrate contrast curve diagrams of power saving when the hard disk has different data filling rates. In FIG. 5 to FIG. 8, exemplary data filling rates are 25%, 50%, 75%, and 100%, respectively. In FIG. 5 through FIG. 8, the curves with "○" thereon represent curve diagrams of changes of average hard disk spin-off percentage along with the increase of the data read request rate for the hard disk per hour taking a vanilla system to which the adaptive threshold idle duration adjustment of the present application is not applied as an example, and the curves with "□" thereon represent curve diagrams of changes of average hard disk spin-off percentage along with the increase of the data read request rate for the hard disk per hour in a case that the adaptive threshold idle duration adjustment of the present application is applied.

It may be clearly seen in reference to FIG. 5 through FIG. 8 that application of the adaptive threshold idle duration adjustment of the present application may obviously achieve the power-saving effect as compared with the vanilla system to which the adaptive threshold idle duration adjustment of the present application is not applied.

The method for controlling the hard disk and the electronic device according to embodiments of the present disclosure may provide advantages that are obviously better than the prior art. Specifically speaking, the method and the electronic device may save more power as compared with the power saving manner in the prior art. Meanwhile, because the method and electronic device ensure the number of power cycles for the hard disk lower than the toleration limit of the hard disk, a fault rate of the hard disk will not be increased. Again, the initial value of the threshold idle duration set for the hard disk according to the method and electronic device is based on a lower bound of a ratio of the expected value of the power cycle duration to the expected value of the threshold idle duration, this may avoid missing the opportunity of saving more power when the hard disk begins to operate because an excessively conservative threshold idle duration is set when the hard disk beings to operation. Finally, the method and electronic device can use less power cycles during extremely low or high load period, so that the saved power cycles may be subsequently used to implement a longer hard disk spin-off time to save more power.

Feasible Implementation Modes

Generally speaking, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. When various aspects of the example embodiments of the present disclosure are illustrated and described as block diagrams, flowcharts, or using some other graphical representations, it will be understood that the blocks, apparatus, systems, techniques or methods described herein may be implemented in, as nonlimiting examples, hardware, software, firmware, special purpose circuits or logic, general purpose hardware or controller or other computing devices, or some combinations thereof.

As an example, the embodiments of the present disclosure may be described in the context of machine-executable instructions, which, for example, are included in program modules executed in devices on a real or virtual processor of a target. In general, program modules include routines, programs, libraries, objects, classes, components, data structures, or the like, and perform specific tasks or implement specific abstract data structures. In various embodiments, functions of the program modules can be merged or split among the described program modules. Machine-executable instructions for program modules may be executed locally or in distributed devices. In distributed devices, the program modules may be located in both local and remote storage media.

Computer program codes for carrying out the methods of the present disclosure may be written in one or more programming languages. These computer program codes may be provided to processors of a general purpose computer, special purpose computer, or other programmable data processing apparatuses, such that the program codes, when being executed by the processors of the computers or other programmable data processing apparatuses, cause the functions/operations specified in the flowcharts and/or block diagrams to be implemented. The program codes may executed entirely on a computer, partly on the computer, as a stand-alone software package, partly on the computer and partly on a remote computer or entirely on the remote computer or server.

In the context of the disclosure, a machine-readable medium may be any tangible media that may contain or store programs for an instruction execution system, apparatus, or device or used by the instruction execution system, apparatus, or device. The machine-readable medium may be a machine-readable signal medium or a machine-readable storage medium. A machine-readable medium may include but not limited to electronic, magnetic, optical, electromagnetic, infrared, or semiconductor systems, apparatuses, or devices, or any suitable combinations thereof. More specific examples of the machine-readable storage medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combinations thereof.

Further, while operations are depicted in a particular order, this should not be understood as requiring that such operations be performed in the particular order shown or in sequential order, or that all illustrated operations be performed to achieve desirable results. In certain circumstances, multitasking or parallel processing may be advantageous. Likewise, while several specific implementation details are contained in the above discussions, these should not be construed as limiting the scope of any disclosure or claims, but should be construed as descriptions of certain embodiments that may be specific to particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combinations.

While the subject matter has been described in languages specific to structural features and/or method actions, it should be understood that the subject matters defined in the appended claims are not limited to the specific features or actions described above. Rather, the specific features and actions described above are disclosed as example forms for implementing the claims.

We claim:
1. A method of controlling a hard disk, comprising:
determining a number of power cycles that have been completed by the hard disk at a time point within a predetermined period of time, a power cycle including a total duration when the hard disk is in a spin-on mode and an immediately neighboring spin-off mode;
in response to the number of power cycles that have been completed being below an upper limit number for the power cycles of the hard disk in the predetermined period of time,
determining remaining time of the predetermined period of time starting from the time point, and
determining, based on the remaining time, the number of power cycles that have been completed, and the upper limit number, a threshold idle duration for controlling the hard disk to enter the spin-off mode; and
in response to the determined threshold idle duration being below a preset threshold idle duration, using the preset threshold idle duration for controlling the hard disk to enter the spin-off mode;
wherein the threshold idle duration is determined based on:

$$I(t) = \frac{D-t}{\lambda(P-c(t))},$$

wherein I(t) represents the threshold idle duration at the time point, D represents a total duration of the predetermined period of time, t represents a duration from a beginning of the predetermined period of time to the time point, λ represents a coefficient, P represents the upper limit number, and c(t) represents the number of power cycles that have been completed at the time point.

2. The method according to claim 1, further comprising:
after the threshold idle duration has been set and in response to an updated number of power cycles that have been completed being equal to the upper limit number, prohibiting the hard disk from entering the spin-off mode for the remaining time.

3. The method according to claim 2, wherein prohibiting the hard disk from entering the spin-off mode for the remaining time comprises setting the threshold idle duration to be greater than a duration of the remaining time.

4. The method according to claim 1, further comprising:
determining an initial value of the threshold idle duration based on:

$$I(0) = \frac{D}{\lambda P},$$

wherein I(0) represents the initial value, D represents a total duration of the predetermined period of time, λ represents a coefficient, and P represents the upper limit number.

5. The method according to claim 1, wherein a value of the coefficient λ is configurable.

6. The method according to claim 1, wherein a value of the coefficient is greater than or equal to a natural constant e.

7. The method according to claim 1, wherein a threshold idle duration value is used to control when the hard disk enters the spin-off mode; and
wherein using the preset threshold idle duration includes:
setting the threshold idle duration value based on the preset threshold idle duration instead of setting the threshold idle duration value based on the determined threshold idle duration.

8. The method according to claim 7, further comprising:
after the threshold idle duration is determined and prior to setting the threshold idle duration value based on the preset threshold idle duration, performing a comparison operation which indicates that the determined threshold idle duration is shorter than the preset threshold idle duration.

9. An electronic device, comprising:
a processor; and
a memory that is coupled to the processor and stores instructions to be executed by the processor, the instructions, when executed by the processor, causing the device to perform acts including:
determining a number of power cycles that have been completed by a hard disk at a time point within a predetermined period of time, a power cycle including a total duration when the hard disk is in a spin-on mode and an immediately neighboring spin-off mode;
in response to the number of power cycles that have been completed being below an upper limit number for the power cycles of the hard disk in the predetermined period of time,
determining remaining time of the predetermined period of time starting from the time point, and
determining, based on the remaining time, the number of power cycles that have been completed, and the upper limit number, a threshold idle duration for controlling the hard disk to enter the spin-off mode, and
in response to the determined threshold idle duration being below a preset threshold idle duration, using the preset threshold idle duration for controlling the hard disk to enter the spin-off mode;
wherein the threshold idle duration is determined based on:

$$I(t) = \frac{D-t}{\lambda(P-c(t))},$$

wherein I(t) represents the threshold idle duration at the time point, D represents a total duration of the predetermined period of time, t represents a duration from a beginning of the predetermined period of time to the time point, λ represents a coefficient, P represents the upper limit number, and c(t) represents the number of power cycles that have been completed at the time point.

10. The electronic device according to claim 9, wherein the acts further include:
after the threshold idle duration has been set and in response to an updated number of power cycles that have been completed being equal to the upper limit number, prohibiting the hard disk from entering the spin-off mode for the remaining time.

11. The electronic device according to claim 10, wherein prohibiting the hard disk from entering the spin-off mode for the remaining time comprises setting the threshold idle duration to be greater than a duration of the remaining time.

12. The electronic device according to claim 9, wherein the acts
further include:
determining an initial value of the threshold idle duration based on:

$$I(0) = \frac{D}{\lambda P},$$

wherein I(0) represents the initial value, D represents a total duration of the predetermined period of time, λ represents a coefficient, and P represents the upper limit number.

13. The electronic device according to claim 9, wherein a value of the coefficient λ is configurable.

14. The electronic device according to claim 9, wherein a value of the coefficient is greater than or equal to a natural constant e.

15. The electronic device according to claim 9, wherein a threshold idle
duration value is used to control when the hard disk enters the spin-off mode; and
wherein using the preset threshold idle duration includes:
setting the threshold idle duration value based on the preset threshold idle duration instead of setting the threshold idle duration value based on the determined threshold idle duration.

16. The electronic device according to claim 15, further comprising:
after the threshold idle duration is determined and prior to setting the threshold idle duration value based on the preset threshold idle duration, performing a comparison operation which indicates that the determined threshold idle duration is shorter than the preset threshold idle duration.

17. A computer program product for controlling a hard disk, the computer program product comprising:
a non-transitory computer readable medium encoded with computer-executable program code for controlling the hard disk, the code configured to enable the execution of:
determining a number of power cycles that have been completed by the hard disk at a time point within a predetermined period of time, a power cycle including a total duration when the hard disk is in a spin-on mode and an immediately neighboring spin-off mode;
in response to the number of power cycles that have been completed being below an upper limit number for the power cycles of the hard disk in the predetermined period of time,
determining remaining time of the predetermined period of time starting from the time point, and
determining, based on the remaining time, the number of power cycles that have been completed, and the upper limit number, a threshold idle duration for controlling the hard disk to enter the spin-off mode; and
in response to the determined threshold idle duration being below a preset threshold idle duration, using the preset threshold idle duration for controlling the hard disk to enter the spin-off mode;

wherein the threshold idle duration is determined based on:

$$I(t) = \frac{D-t}{\lambda(P-c(t))},$$

wherein I(t) represents the threshold idle duration at the time point, D represents a total duration of the predetermined period of time, t represents a duration from a beginning of the predetermined period of time to the time point, λ represents a coefficient, P represents the upper limit number, and c(t) represents the number of power cycles that have been completed at the time point.

18. The computer program product according to claim 17, wherein the code is further configured to enable the execution of:

after the threshold idle duration has been set and in response to an updated number of power cycles that have been completed being equal to the upper limit number, prohibiting the hard disk from entering the spin-off mode for the remaining time.

19. The computer program product according to claim 18, wherein prohibiting the hard disk from entering the spin-off mode for the remaining time comprises setting the threshold idle duration to be greater than a duration of the remaining time.

20. The computer program product according to claim 17, wherein a threshold idle duration value is used to control when the hard disk enters the spin-off mode; and wherein using the preset threshold idle duration includes:

setting the threshold idle duration value based on the preset threshold idle duration instead of setting the threshold idle duration value based on the determined threshold idle duration.

21. The computer program product according to claim 20, wherein the code is further configured to enable the execution of:

after the threshold idle duration is determined and prior to setting the threshold idle duration value based on the preset threshold idle duration, performing a comparison operation which indicates that the determined threshold idle duration is shorter than the preset threshold idle duration.

\* \* \* \* \*